United States Patent
Liu et al.

(10) Patent No.: US 11,190,312 B2
(45) Date of Patent: Nov. 30, 2021

(54) PARAMETER CONFIGURATION METHOD AND APPARATUS

(71) Applicant: HUAWEI TECHNOLOGIES CO., LTD., Guangdong (CN)

(72) Inventors: Yong Liu, Shanghai (CN); Xiaoyan Bi, Shanghai (CN); Leiming Zhang, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 29 days.

(21) Appl. No.: 16/665,875

(22) Filed: Oct. 28, 2019

(65) Prior Publication Data

US 2020/0059334 A1 Feb. 20, 2020

Related U.S. Application Data

(63) Continuation of application No. PCT/CN2018/082856, filed on Apr. 12, 2018.

(30) Foreign Application Priority Data

Apr. 28, 2017 (CN) .......................... 201710299849.7

(51) Int. Cl.
*H04L 5/00* (2006.01)
*H04W 76/27* (2018.01)
(Continued)

(52) U.S. Cl.
CPC .......... *H04L 5/0041* (2013.01); *H04L 5/0005* (2013.01); *H04L 25/0204* (2013.01); *H04W 72/042* (2013.01); *H04W 76/27* (2018.02)

(58) Field of Classification Search
CPC ... H04L 5/0044; H04L 5/0005; H04L 5/0041; H04L 5/0007; H04L 25/0204; H04L 5/00;
(Continued)

(56) References Cited

U.S. PATENT DOCUMENTS 9,148,204 B2 * 9/2015 Bhattad ................. H04L 5/0044
9,253,784 B2 * 2/2016 Liu ..................... H04L 25/03343
(Continued)

FOREIGN PATENT DOCUMENTS

CN 101064638 A 10/2007
CN 101064903 A 10/2007
(Continued)

OTHER PUBLICATIONS

3GPP TS 36.213 V14.2.0 (Mar. 2017),3rd Generation Partnership Project;Technical Specification Group Radio Access Network;Evolved Universal Terrestrial Radio Access (E-UTRA); Physical layer procedures(Release 14), Mar. 2017, 454 pages.
(Continued)

*Primary Examiner* — Man U Phan
(74) *Attorney, Agent, or Firm* — Fish & Richardson P.C.

(57) ABSTRACT

Embodiments of this application disclose a parameter configuration method and apparatus, relate to the field of communications technologies, and specifically provide a method and an apparatus for setting a resource unit bundling size, to help improve accuracy of a channel estimation result. The method may include: generating parameter configuration signaling, and sending the parameter configuration signaling. The parameter configuration signaling is used to indicate the resource unit bundling size. The resource unit bundling size may be applied to at least two inconsecutive time-frequency resources in frequency domain, and each time-frequency resource includes at least one consecutive resource unit in frequency domain; or may be applied to at least two inconsecutive time-frequency resources in time domain, and each time-frequency resource includes at least one consecutive resource unit in time domain.

8 Claims, 10 Drawing Sheets

(51) Int. Cl.
*H04L 25/02* (2006.01)
*H04W 72/04* (2009.01)

(58) Field of Classification Search
CPC ...... H04L 25/02; H04W 76/27; H04W 72/12; H04W 72/042; H04W 72/04
USPC .......................................................... 370/329
See application file for complete search history.

(56) References Cited

U.S. PATENT DOCUMENTS

| | | | | |
|---|---|---|---|---|
| 9,425,934 | B2* | 8/2016 | Seo | H04L 5/0051 |
| 9,516,655 | B2* | 12/2016 | Liu | H04B 7/0478 |
| 9,955,385 | B2* | 4/2018 | Rico Alvarino | H04L 1/0046 |
| 9,985,802 | B2* | 5/2018 | Jiang | H04L 5/0082 |
| 9,986,545 | B2* | 5/2018 | Kim | H04W 72/042 |
| 10,172,155 | B2* | 1/2019 | Rico Alvarino | H04W 72/042 |
| 10,313,160 | B2* | 6/2019 | Jiang | H04L 25/0226 |
| 10,348,468 | B2* | 7/2019 | Seo | H04L 25/0228 |
| 10,404,432 | B2* | 9/2019 | Yuk | H04L 1/00 |
| 10,609,566 | B2* | 3/2020 | Go | H04L 5/0044 |
| 2011/0310831 | A1 | 12/2011 | Bhattad et al. | |
| 2014/0348012 | A1 | 11/2014 | Wu | |
| 2016/0014728 | A1 | 1/2016 | Seo et al. | |
| 2019/0320450 | A1 | 10/2019 | Li et al. | |

FOREIGN PATENT DOCUMENTS

| | | |
|---|---|---|
| CN | 101657018 A | 2/2010 |
| CN | 102223719 A | 10/2011 |
| CN | 103210605 A | 7/2013 |
| CN | 103378924 A | 10/2013 |
| CN | 105554893 A | 5/2016 |
| CN | 105979597 A | 9/2016 |
| CN | 107046729 A | 8/2017 |

OTHER PUBLICATIONS

Office Action issued in Chinese application No. 201910357969.7 dated Dec. 23, 2019, 23 pages (With English Translation).
PCT International Search Report and Written Opinion in International Application No. PCT/CN2018/082,856, dated Jun. 14, 2018, 15 pages (With English Translation).
CATT, "Discussion on UL frequency selective precoding," 3GPP TSG RAN WG1 AH_NR Meeting, R1-1700221, Spokane, USA, Jan. 16-20, 2017, 2 pages.
Extended European Search Report and Written Opinion issued in European Application No. 18790475.0 dated Apr. 16, 2020, 11 pages.
Huawei et al., "Discussion on TTI bundling extension for TDD," 3GPP TSG RAN WG1 Meeting #75, R1-135028, San Francisco, USA, Nov. 11-15, 2013, 10 pages.
Huawei et al., "PRB bundling size for DL data precoding," 3GPP TSG RAN WGI NR Ad Hoc Meeting, R1-1709925, Qingdao, China, Jun. 27-30, 2017, 6 pages.

* cited by examiner

PARAMETER CONFIGURATION METHOD AND APPARATUS

CROSS-REFERENCE TO RELATED APPLICATIONS

This application a continuation of International Application No. PCT/CN2018/082856, filed on Apr. 12, 2018, which claims priority to Chinese Patent Application No. 201710299849.7, filed on Apr. 28, 2017. The disclosures of the aforementioned applications are hereby incorporated by reference in their entireties.

TECHNICAL FIELD

Embodiments of this application relate to the field of communications technologies, and in particular, to a parameter configuration method and apparatus.

BACKGROUND

In a long term evolution (long term evolution, LTE) system, a physical resource block (physical resource block, PRB) bundling size (bundling size) varies with system bandwidth, and a preset correspondence exists between the PRB bundling size and the system bandwidth.

There are various scenarios in a 5G communications system. Setting the PRB bundling size in the foregoing manner cannot meet a requirement of the 5G communications system. For example, if a time-frequency resource used by a base station to schedule a terminal is inconsecutive in frequency domain or inconsecutive in time domain, setting the PRB bundling size in the foregoing manner may cause inaccuracy of a channel estimation result.

SUMMARY

This application provides a parameter configuration method and apparatus, and specifically provides a method and an apparatus for setting a resource unit bundling size. The technical solution is applicable to a scenario in which a base station uses inconsecutive time-frequency resources in frequency domain or time domain to schedule a terminal, and helps improve accuracy of a channel estimation result in this scenario.

According to a first aspect, this application provides a parameter configuration method and apparatus.

In a possible design, the method may include: generating parameter configuration signaling, and then sending the parameter configuration signaling. The method may be performed by a base station. The parameter configuration signaling is used to indicate a resource unit bundling size. The resource unit bundling size may be applied to at least two inconsecutive time-frequency resources in frequency domain, and each time-frequency resource includes at least one consecutive resource unit in frequency domain; or may be applied to at least two inconsecutive time-frequency resources in time domain, and each time-frequency resource includes at least one consecutive resource unit in time domain. The possible design provides a solution for flexibly setting the resource unit bundling size. The solution may be applied to a scenario in which the base station uses inconsecutive time-frequency resources in frequency domain or time domain to schedule a terminal, to improve accuracy of a channel estimation result in this scenario. It may be understood that the resource unit bundling size may be further applied to processes such as data demodulation and interference measurement. In these processes, accuracy of calculation results may also be improved.

In a possible design, the parameter configuration signaling is DCI, MAC signaling, or the like, and the parameter configuration signaling is used to indicate an index of a resource unit bundling size. Before the parameter configuration signaling is generated, the method may further include: generating system configuration signaling, and then sending the system configuration signaling. The system configuration signaling includes a plurality of information entries, and each information entry records one resource unit bundling size and an index of the resource unit bundling size. The system configuration signaling may be RRC signaling or the like. In this way, accuracy of calculation results in different operation processes can be improved while dynamic signaling overheads can be reduced.

Correspondingly, this application further provides a parameter configuration apparatus, to implement the parameter configuration method provided in the first aspect. For example, the apparatus may be the base station. The parameter configuration method provided in the first aspect may be implemented by using software or hardware, or by using hardware by executing corresponding software.

In a possible design, the apparatus may include a processor, a memory, and a communications interface. The processor is configured to support the apparatus in executing a corresponding function in the parameter configuration method provided in the first aspect. The memory is configured to be coupled to the processor, and stores a necessary program instruction and necessary data of the apparatus. The communications interface is configured to support the apparatus in communicating with another network element. The communications interface may be a transceiver.

In a possible design, the apparatus may include a generation unit and a sending unit. The generation unit is configured to generate the parameter configuration signaling. The sending unit is configured to send the parameter configuration signaling.

In a possible design, the generation unit is further configured to generate the system configuration signaling. The sending unit is further configured to send the system configuration signaling.

According to a second aspect, this application provides a parameter configuration method and apparatus.

In a possible design, the method may include: receiving parameter configuration signaling, and then determining a resource unit bundling size based on the parameter configuration signaling. The method may be performed by a terminal. The parameter configuration signaling is used to indicate the resource unit bundling size. The resource unit bundling size may be applied to at least two inconsecutive time-frequency resources in frequency domain, and each time-frequency resource includes at least one consecutive resource unit in frequency domain; or may be applied to at least two inconsecutive time-frequency resources in time domain, and each time-frequency resource includes at least one consecutive resource unit in time domain.

In a possible design, the parameter configuration signaling is DCI, MAC signaling, or the like, and the parameter configuration signaling is used to indicate an index of a resource unit bundling size. Before the parameter configuration signaling is received, the method may further include receiving system configuration signaling. The system configuration signaling includes a plurality of information entries, and each information entry records one resource unit bundling size and an index of the resource unit bundling size. The system configuration signaling may be RRC signaling or the like.

Correspondingly, this application further provides a parameter configuration apparatus, to implement the parameter configuration method provided in the second aspect. For example, the apparatus may be the terminal. The parameter configuration method provided in the second aspect may be implemented by using software or hardware, or by using hardware by executing corresponding software.

In a possible design, the apparatus may include a processor, a memory, and a communications interface. The processor is configured to support the apparatus in executing a corresponding function in the parameter configuration method provided in the second aspect. The memory is configured to be coupled to the processor, and stores a necessary program instruction and necessary data of the apparatus. The communications interface is configured to support the apparatus in communicating with another network element. The communications interface may be a transceiver.

In a possible design, the apparatus may include a receiving unit and a determining unit. The receiving unit is configured to receive the parameter configuration signaling. The determining unit is configured to determine the resource unit bundling size based on the parameter configuration signaling.

In a possible design, the receiving unit may be further configured to receive the system configuration signaling.

Based on any one of the foregoing possible designs, the parameter configuration signaling is one of the following: RRC signaling, MAC signaling, and DCI. Certainly, specific implementation is not limited thereto.

It may be understood that for related descriptions of the parameter configuration signaling and the system configuration signaling, refer to the method provided in the second aspect. For explanation of related content in any possible design of the second aspect, refer to the corresponding solution in the first aspect. Details are not described herein again.

According to a third aspect, this application provides a parameter configuration method and apparatus.

In a possible design, the method may include: generating system configuration signaling, and then sending the system configuration signaling. The method may be performed by a base station. The system configuration signaling includes a plurality of information entries, and each information entry records one resource unit bundling size and an index of the resource unit bundling size. The resource unit bundling size may be applied to at least two inconsecutive time-frequency resources in frequency domain, and each time-frequency resource includes at least one consecutive resource unit in frequency domain; or may be applied to at least two inconsecutive time-frequency resources in time domain, and each time-frequency resource includes at least one consecutive resource unit in time domain. The possible design provides a solution for flexibly setting the resource unit bundling size. The solution may be applied to a scenario in which the base station uses inconsecutive time-frequency resources in frequency domain or time domain to schedule a terminal, to improve accuracy of a channel estimation result in this scenario. It may be understood that the resource unit bundling size may be further applied to processes such as data demodulation and interference measurement. In these processes, accuracy of calculation results may also be improved.

In a possible design, the method may further include: generating parameter configuration signaling, where the parameter configuration signaling is used to indicate an index of a target resource unit bundling size, and the target resource unit bundling size is included in the plurality of information entries; and then sending the parameter configuration signaling. In this way, accuracy of calculation results in different operation processes can be improved while dynamic signaling overheads can be reduced.

Correspondingly, this application further provides a parameter configuration apparatus, to implement the parameter configuration method provided in the third aspect. For example, the apparatus may be the base station. The parameter configuration method provided in the third aspect may be implemented by using software or hardware, or by using hardware by executing corresponding software.

In a possible design, the apparatus may include a processor, a memory, and a communications interface. The processor is configured to support the apparatus in executing a corresponding function in the parameter configuration method provided in the third aspect. The memory is configured to be coupled to the processor, and stores a necessary program instruction and necessary data of the apparatus. The communications interface is configured to support the apparatus in communicating with another network element. The communications interface may be a transceiver.

In a possible design, the apparatus may include a generation unit and a sending unit. The generation unit is configured to generate the system configuration signaling. The sending unit is configured to send the system configuration signaling.

In a possible design, the generation unit is further configured to generate the parameter configuration signaling. The sending unit is further configured to send the parameter configuration signaling. The parameter configuration signaling may be DCI or the like. Certainly, specific implementation is not limited thereto.

Based on any possible design of the third aspect, the system configuration signaling may be RRC signaling, MAC signaling, or the like. Certainly, specific implementation is not limited thereto.

For related descriptions of the system configuration signaling and the parameter configuration signaling, refer to the method provided in the third aspect.

According to a fourth aspect, this application provides a parameter configuration method and apparatus.

In a possible design, the method may include: receiving system configuration signaling, where the system configuration signaling includes a plurality of information entries, and each information entry records one resource unit bundling size and an index of the resource unit bundling size; and a resource unit bundling size is applied to at least two inconsecutive time-frequency resources in frequency domain, and each time-frequency resource includes at least one consecutive resource unit in frequency domain; or applied to at least two inconsecutive time-frequency resources in time domain, and each time-frequency resource includes at least one consecutive resource unit in time domain; and then determining a target resource unit bundling size based on the plurality of information entries, where the target resource unit bundling size is included in one of the plurality of information entries. The method may be performed by a terminal.

In a possible design, the method may further include receiving parameter configuration signaling, and the parameter configuration signaling is used to indicate an index of the target resource unit bundling size. In this case, the determining a target resource unit bundling size based on the plurality of information entries may include determining the target resource unit bundling size based on the parameter configuration signaling and the plurality of information entries.

Correspondingly, this application further provides a parameter configuration apparatus, to implement the parameter configuration method provided in the fourth aspect. For example, the apparatus may be the terminal. The parameter configuration method provided in the fourth aspect may be implemented by using software or hardware, or by using hardware by executing corresponding software.

In a possible design, the apparatus may include a processor, a memory, and a communications interface. The processor is configured to support the apparatus in executing a corresponding function in the parameter configuration method provided in the fourth aspect. The memory is configured to be coupled to the processor, and stores a necessary program instruction and necessary data of the apparatus. The communications interface is configured to support the apparatus in communicating with another network element. The communications interface may be a transceiver.

In a possible design, the apparatus may include a receiving unit and a determining unit. The receiving unit is configured to receive the parameter configuration signaling. The determining unit is configured to determine the target resource unit bundling size based on the parameter configuration signaling and the plurality of information entries.

In a possible design, the receiving unit may be further configured to receive the parameter configuration signaling. In this case, the determining unit may be specifically configured to determine the target resource unit bundling size based on the parameter configuration signaling and the plurality of information entries. The parameter configuration signaling may be DCI or the like. Certainly, specific implementation is not limited thereto.

Based on any possible design of the fourth aspect, the system configuration signaling may be RRC signaling or the like. Certainly, specific implementation is not limited thereto.

It may be understood that for related descriptions of the system configuration signaling and the parameter configuration signaling, refer to the method provided in the fourth aspect. For explanation of related content in any possible design of the fourth aspect, refer to the corresponding solution in the third aspect. Details are not described herein again.

Based on any possible design provided in any one of the foregoing aspects, the resource unit bundling size is one of the following:

one resource unit;

N resource units, where N is a common divisor of total quantities of resource units included in all of the at least two time-frequency resources, or a total quantity of resource units included in a precoding granularity, or a divisor of a total quantity of resource units included in a precoding granularity, or a smaller one of a greatest common divisor of total quantities of resource units included in all of the at least two time-frequency resources and a total quantity of resource units included in a precoding granularity;

a divisor of a total quantity of RBs included in an RBG, where a resource unit is an RBG; and a divisor of a total quantity of TIs included in a TIG, where a resource unit is a TIG.

This application further provides a computer storage medium. The computer storage medium stores a computer program instruction. When the program instruction runs on a computer, the computer performs the method in any one of the foregoing aspects.

This application further provides a computer program product. When the computer program product runs on a computer, the computer performs the method in any one of the foregoing aspects.

It may be understood that any apparatus, any computer storage medium, or any computer program product provided above is configured to perform a corresponding method provided above. Therefore, for beneficial effects that can be achieved by any apparatus, any computer storage medium, or any computer program product, refer to beneficial effects in a corresponding solution in the following embodiments. Details are not described herein again.

DESCRIPTION OF EMBODIMENTS

Figure 1:
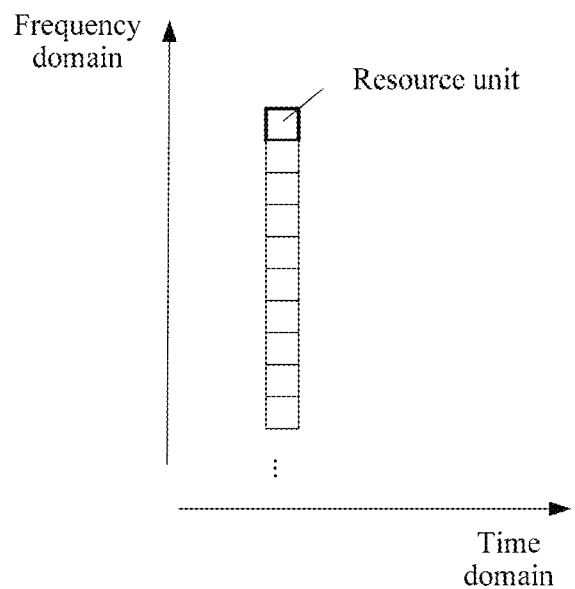
FIG. 1 is a schematic distribution diagram of a resource unit according to this application.

PRB bundling is a technology used to improve channel estimation performance. In a technical solution of the PRB bundling, sizes of consecutive PRBs preprocessed in a same manner (including beamforming, precoding, and the like) are used through agreement, and the sizes are generally greater than 1. When a terminal performs joint channel estimation based on a plurality of PRBs, extrapolation calculation of channel estimation may be reduced. In the channel estimation, a channel estimation deviation obtained through extrapolation calculation is relatively large. Therefore, accuracy of the channel estimation can be improved by reducing extrapolation calculation (changing the extrapolation calculation to interpolation calculation).

From a perspective of the channel estimation, a larger PRB bundling size leads to higher channel estimation accuracy. However, when the PRB bundling size increases to a specific value, an accuracy gain of the channel estimation is converged. Therefore, a limited quantity of values are defined for the PRB bundling size, and the PRB bundling size does not need to increase unlimitedly. An accuracy gain of the channel estimation brought by increasing the PRB bundling size is also related to a channel environment. For example, a flatter frequency domain channel leads to a smaller channel estimation extrapolation loss. In this scenario, the accuracy gain of the channel estimation brought by increasing the PRB bundling size is limited. In addition, a larger PRB bundling size leads to higher channel estimation complexity. Therefore, from a perspective of terminal implementation complexity, a limited quantity of values are defined for the PRB bundling size.

In different scenarios, for example, the different scenario may be distinguished by using a channel environment, in comprehensive consideration of a channel estimation gain, terminal implementation complexity, a terminal scheduling status, and the like, optimal PRB bundling sizes are different. Therefore, the PRB bundling size needs to be configurable.

Based on this, this application provides a parameter configuration method and apparatus. A basic principle of the method and the apparatus is that a resource unit bundling size is set in a signaling indication manner. The resource unit bundling size may be specifically applied to the following scenarios: Scenario 1: The resource unit bundling size is applied to at least two inconsecutive time-frequency resources in frequency domain, and each time-frequency resource includes at least one consecutive resource unit in frequency domain. Scenario 2: The resource unit bundling size is applied to at least two inconsecutive time-frequency resources in time domain, and each time-frequency resource includes at least one consecutive resource unit in time domain. The at least two time-frequency resources may be time-frequency resources used when a base station schedules a terminal. It may be understood that use scenarios of this application are described in the foregoing from a perspective of whether a resource unit is consecutive in frequency domain or time domain. It is not difficult to understand that time-frequency resources that are inconsecutive in frequency domain and consecutive in time domain may be described by using Scenario 1, and time-frequency resources that are inconsecutive in time domain and consecutive in frequency domain may be described by using Scenario 2. Time-frequency resources that are inconsecutive in frequency domain and time domain may be described by using Scenario 1 or Scenario 2. Therefore, the technical solution provided in this application is applicable to a scenario in which time-frequency resources are inconsecutive in at least one of frequency domain and time domain.

For ease of understanding, the following briefly describes related terms used in this application.

(1) Resource Unit (Resource Unit)

The resource unit is similar to an RB, an RB pair (RB pair), an RB group (RB group, RBG), or a time interval group (time interval group, TIG) in an LTE system, and the resource unit is used in some embodiments of this application. The resource unit may be used as a basic unit for resource allocation for scheduling a terminal, or may be used to describe an arrangement manner of a plurality of reference signals, or the like. One RB pair refers to two adjacent RBs in time domain. The RBG is a time-frequency resource including one TI in time domain and one or more consecutive RBs in frequency domain. The TIG is a time-frequency resource including one RB in frequency domain and one or more consecutive TIs in time domain. It may be understood that concepts of the PRB and the RB are the same in this specification.

Figure 2:
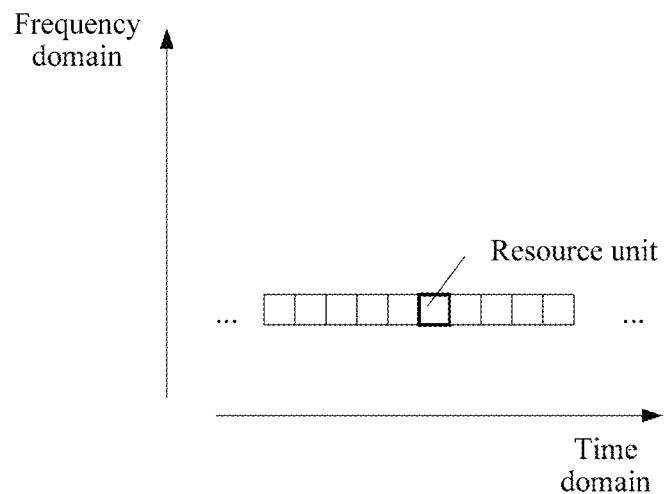
FIG. 2 is another schematic distribution diagram of a resource unit according to this application.

The resource unit may include a plurality of consecutive subcarriers in frequency domain and a fixed quantity (for example, 1) of time intervals (time interval, TI) in time domain, as shown in FIG. 1, or may include one or more consecutive TIs in time domain and a plurality of consecutive subcarriers in frequency domain, as shown in FIG. 2. In FIG. 1 and FIG. 2, each small box represents one resource unit. In different scheduling processes, sizes of resource units may be the same or different. The TI herein may be a transmission time interval (transmission time interval, TTI) or a symbol-level short TTI in the LTE system, a short TTI with a large subcarrier spacing in a high frequency system, a slot (slot) or a mini-slot (mini-slot) in a 5G system, or the like. This is not limited in this application.

Figure 3:
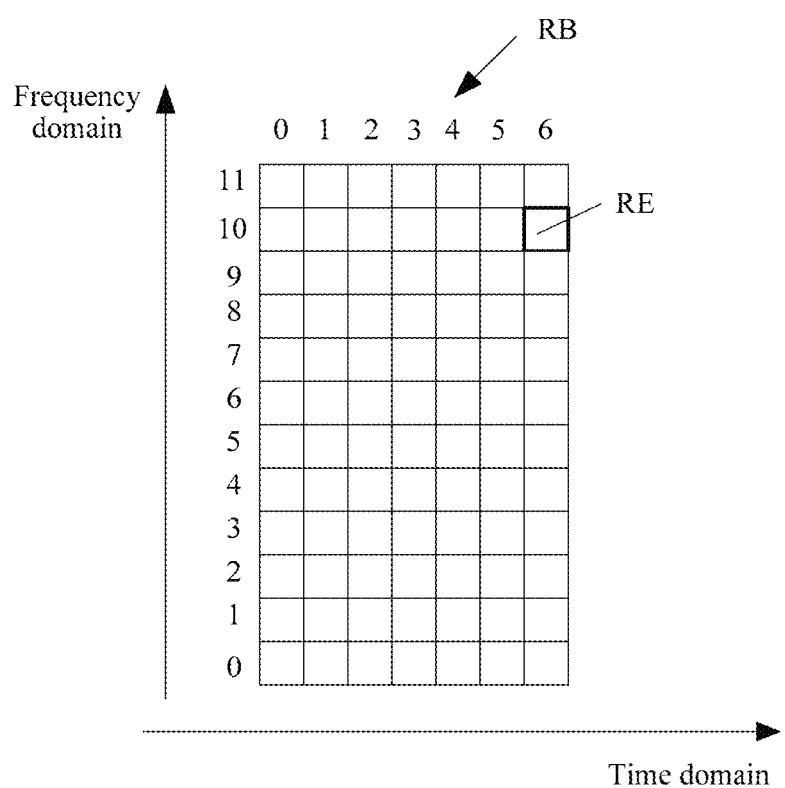
FIG. 3 is a schematic diagram of a resource unit according to this application.

Optionally, one resource unit may include but is not limited to any one of the following: one or more RBs, one or more RB pairs, one or more RBGs, or the like, and in addition, may be a half RB or the like. In addition, the resource unit may be another time-frequency resource, and this is not limited in this application. The following uses an example for description in which one resource unit is one RB. As shown in FIG. 3, one RB may include 12 consecutive subcarriers (numbered 0 to 11) in frequency domain and 7 symbols (numbered 0 to 6) in time domain. A time-frequency resource including one subcarrier in frequency domain and one symbol in time domain is one resource element (resource element, RE). It may be understood that the "symbol" in this application may include but is not limited to any one of the following: an orthogonal frequency division multiplexing (orthogonal frequency division multiplexing, OFDM) symbol, a universal filtered multi-carrier (universal filtered multi-carrier, UFMC) signal, a filter bank multicarrier (filter bank multi-carrier, FBMC) symbol, a generalized frequency division multiplexing (generalized frequency division multiplexing, GFDM) symbol, or the like.

(2) Resource Unit Bundling Size

Resource unit bundling may be understood as follows: One or more resource units are used as a whole, and an operation is performed based on the whole. In the following, the whole is marked as a resource unit set. For example, the terminal performs joint channel estimation based on a demodulation reference signal (demodulation reference signal, DMRS) carried in the resource unit set. For another example, in a data demodulation process, the terminal determines an equalization coefficient based on the resource unit set. For still another example, the terminal performs interference measurement based on the DMRS carried in the resource unit set. Other examples are not enumerated. The following uses an example for description in which resource unit bundling is applied to a channel estimation process.

The resource unit bundling size may be understood as a size of the resource unit set, and may be specifically marked by using a total quantity of resource units included in the resource unit set. In addition, the resource unit bundling size may also be marked by using other information, and this is not limited in this application. It should be noted that in different use processes (for example, processes of channel estimation, data demodulation, or interference measurement), quantities of resource units included in the resource unit set may be the same or different. In other words, in the different use processes, resource unit bundling sizes may be the same or different.

Figure 4:
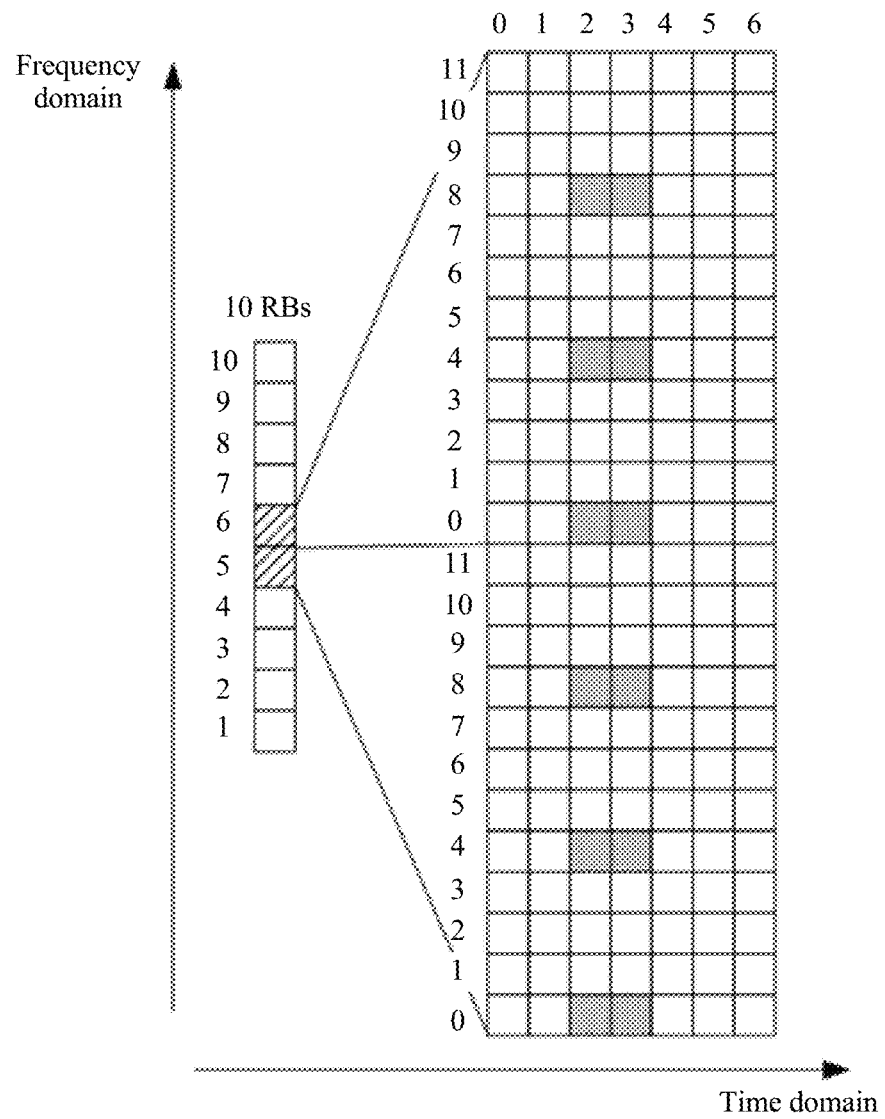
FIG. 4 is a schematic distribution diagram of a scheduling resource according to this application.

That one resource unit is one RB is used as an example. As shown in FIG. 4, it is assumed that a total system bandwidth is 10 RBs (respectively marked as an RB 1 to an RB 10), and the base station schedules the terminal on an RB 5 and an RB 6 (as shown by small shadow boxes representing RBs in FIG. 4), the resource unit bundling size may be 2 RBs, and the terminal may perform joint channel estimation by using DMRSs carried on the two RBs. For example, it is assumed that DMRSs carried on the RB 5 and the RB 6 are shown in FIG. 4. Specifically, DMRSs are carried on a second symbol and a third symbol in time domain of each RB and six REs on a zeroth subcarrier, a fourth subcarrier, and an eighth subcarrier in frequency domain of each RB. Therefore, the terminal may perform joint channel estimation by using DMRSs carried on a total of 12 REs (small shadow boxes representing REs in FIG. 4) on the fifth RB and the sixth RB. For example, if the channel estimation is implemented in an interpolation manner, the interpolation may be performed on a plurality of RBs. For example, the terminal may perform interpolation by using a DMRS on the second symbol and the eighth subcarrier on the fifth RB and a DMRS on the second symbol and the zeroth subcarrier on the sixth RB.

It may be understood that, when the terminal performs the channel estimation based on a time-frequency resource after resource unit bundling, more known reference signals are used, so that accuracy of a calculation result can be improved.

Generally, one terminal may have one resource unit bundling size, and different terminals may have a same resource unit bundling size or different resource unit bundling sizes. At different moments, one terminal may have different resource unit bundling sizes.

(3) Scheduling Resource

The scheduling resource is a time-frequency resource used when a base station schedules a terminal.

(4) Other Terms

The term "a plurality of" in this specification means two or more than two.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The technical solutions provided in this application may be applied to various communications systems, for example, current 2G 3G and 4G communications systems, and a future evolved network such as a 5G communications system, for example, an LTE system, a cellular system related to the 3rd generation partnership project (3rd generation partnership project, 3GPP), and other similar communications systems, and in particular, may be applied to a 5G NR system. It should be noted that the 5G standard may include scenarios such as machine-to-machine (machine-to-machine, M2M), D2M, macro-micro communication, enhanced mobile broadband (enhanced mobile broadband, eMBB), ultra-reliable and low latency communications (ultra-reliable and low latency communications, uRLLC), and massive internet of things communications (massive machine type communication, mMTC). These scenarios may include but are not limited to a communication scenario between terminals, a communication scenario between base stations, a communication scenario between a base station and a terminal, and the like. The technical solutions provided in this application may also be applied to scenarios such as communication between terminals or communication between gNBs in the 5G communications system.

Figure 5:
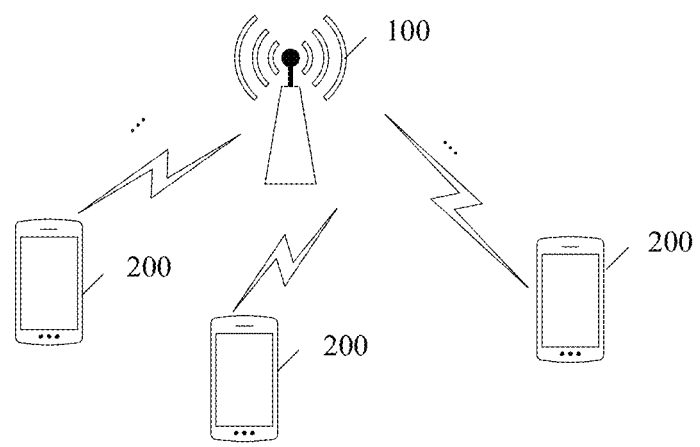
FIG. 5 is a schematic diagram of a system architecture to which a technical solution is applicable according to this application.

The technical solution provided in this application may be applied to a system architecture shown in FIG. 5. The system architecture may include a base station 100 and one or more terminals 200 connected to the base station 100.

The base station 100 may be a device that can communicate with the terminal 200. The base station 100 may be a relay station, an access point, or the like. The base station 100 may be a base transceiver station (base transceiver station, BTS) in a global system for mobile communications (global system for mobile communications, GSM) or a code division multiple access (code division multiple access, CDMA) network, or may be an NB (NodeB) in wideband code division multiple access (wideband code division multiple access, WCDMA), or may be an eNB or an eNodeB (evolved NodeB) in LTE. Alternatively, the base station 100 may be a radio controller in a cloud radio access network (cloud radio access network, CRAN) scenario. The base station 100 may also be a network device in a future 5G network or a network device in a future evolved PLMN network, or may be a wearable device, an in-vehicle device, or the like.

The terminal 200 may be user equipment (user equipment, UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, or another processing device connected to a wireless modem, an in-vehicle device, a wearable device, a terminal in a future 5G network, or a terminal in a future evolved PLMN network, or the like.

Figure 6:
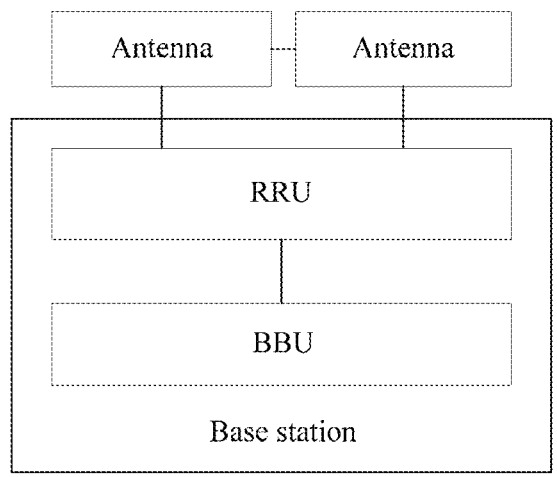
FIG. 6 is a schematic structural diagram of a base station according to this application.

In an example, the base station 100 may be implemented by using a structure shown in FIG. 6. FIG. 6 shows a universal hardware architecture of a base station. The base station shown in FIG. 6 may include a building baseband unit (building baseband unit, BBU) and a remote radio unit (remote radio unit, RRU). The RRU is connected to an antenna system (namely, an antenna). The BBU and RRU may be separately used as required. It should be noted that in a specific implementation process, the base station 100 may further use another universal hardware architecture, and is not limited only to the universal hardware architecture shown in FIG. 6.

Figure 7:
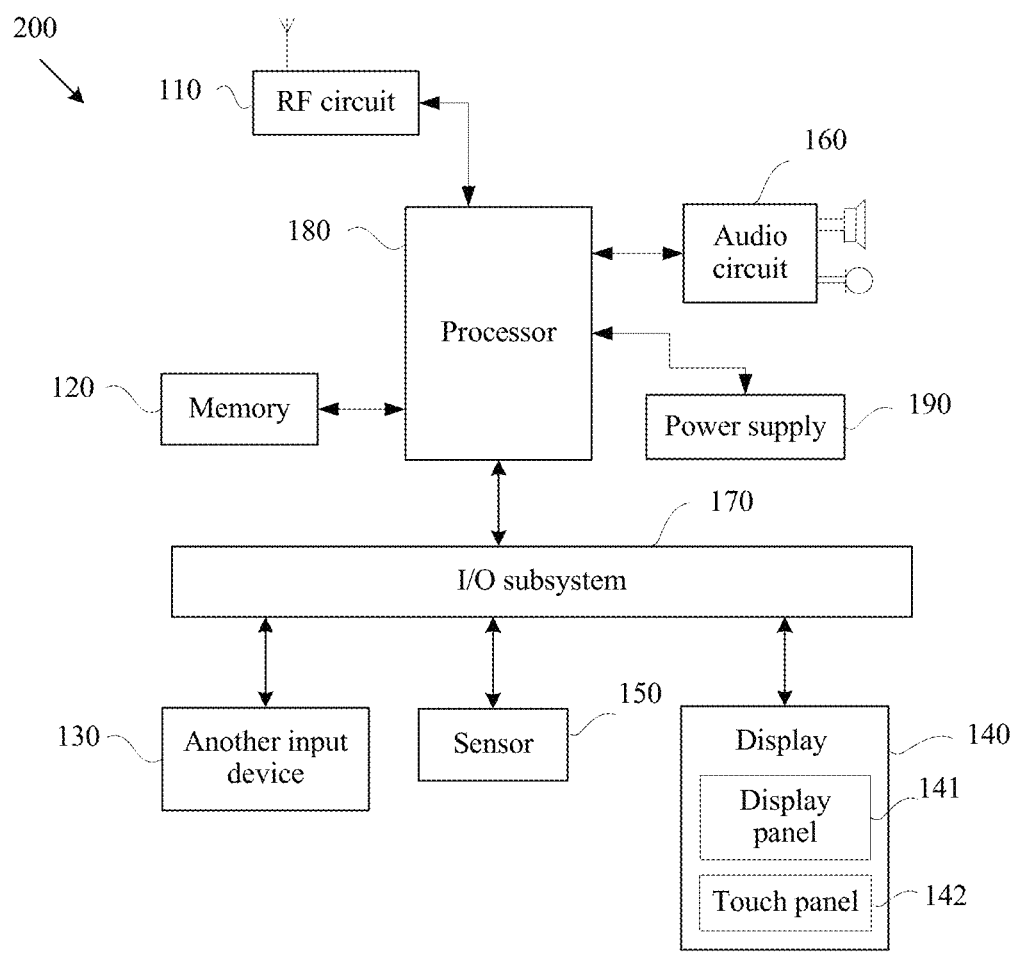
FIG. 7 is a schematic structural diagram of a terminal according to this application.

In an example, the terminal 200 may be implemented by using a structure shown in FIG. 7. That the terminal 200 is a mobile phone is used as an example. FIG. 7 shows a universal hardware architecture of the mobile phone for description. The mobile phone shown in FIG. 7 may include components such as a radio frequency (radio Frequency, RF) circuit 110, a memory 120, another input device 130, a display 140, a sensor 150, an audio circuit 160, an I/O subsystem 170, a processor 180, and a power supply 190. A person skilled in the art may understand that a structure of the mobile phone shown in FIG. 7 does not constitute any limitation on the mobile phone, and may include more or fewer components than those shown in the figure, or some components may be combined, or some components may be split, or different component arrangements may be used. A person skilled in the art may understand that the display 140 is a user interface (user Interface, UI), and the display 140 may include a display panel 141 and a touch panel 142. In addition, the mobile phone may include more or fewer components than those shown in the figure. Although not shown, the mobile phone may further include a functional module or a component such as a camera or a Bluetooth module. Details are not described herein.

Further, the processor 180 is separately connected to the RF circuit 110, the memory 120, the audio circuit 160, the I/O subsystem 170, and the power supply 190. The I/O subsystem 170 is separately connected to the another input device 130, the display 140, and the sensor 150. The RF circuit 110 may be configured to receive and send a signal in information sending and receiving processes or a call process, and particularly, after receiving downlink information of the base station, send the downlink information to the processor 180 for processing. The memory 120 may be configured to store a software program and a module. By running the software program and the module stored in the memory 120, the processor 180 executes various function applications and data processing of the mobile phone. The another input device 130 may be configured to receive input digit or character information, and generate a key signal input related to user setting and function control of the mobile phone. The display 140 may be configured to display information entered by a user or information provided to a user, and various menus of the mobile phone, and may further receive a user input. The sensor 150 may be an optical sensor, a motion sensor, or another sensor. The audio circuit 160 may provide an audio interface between the user and the mobile phone. The I/O subsystem 170 is configured to control an external input/output device, and the external device may include another input device controller, a sensor controller, and a display controller. The processor 180 is a control center of the mobile phone 200, uses various interfaces and lines to connect all parts of the entire mobile phone, and executes various functions and processes data of the mobile phone 200 by running or executing software programs and/or modules stored in the memory 120 and invoking data stored in the memory 120, to perform overall monitoring on the mobile phone. The power supply 190 (for example, a battery) is configured to supply power to the foregoing components. Optionally, the power supply may be logically connected to the processor 180 by using a power management system, to implement functions such as charging, discharging, and power consumption management by using the power management system.

The following describes parameter configuration methods provided in this application.

Figure 8A:
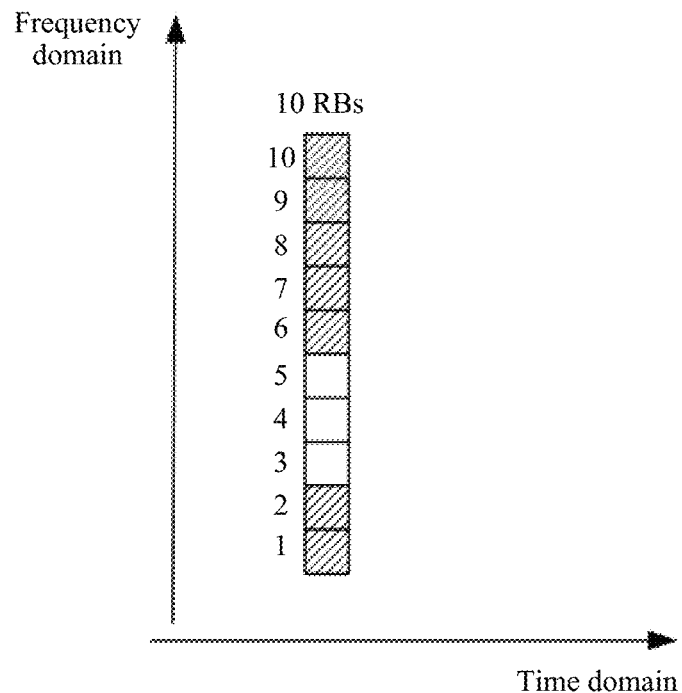
FIG. 8a is another schematic distribution diagram of a scheduling resource according to this application.
Figure 8B:
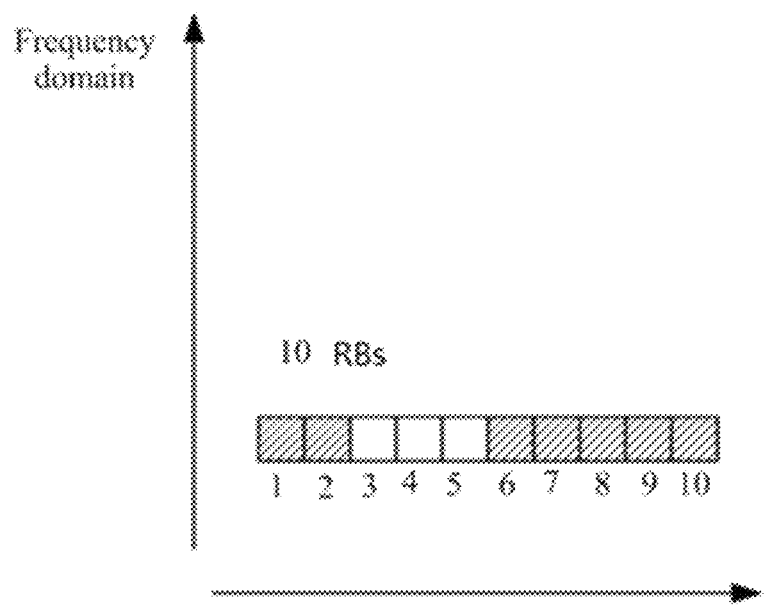
FIG. 8b is another schematic distribution diagram of a scheduling resource according to this application.

It should be noted that a resource unit bundling size provided in this application may be applied to at least two inconsecutive time-frequency resources in frequency domain, and each time-frequency resource includes at least one consecutive resource unit in frequency domain, as shown in FIG. 8a. The resource unit bundling size may also be applied to at least two inconsecutive time-frequency resources in time domain, and each time-frequency resource includes at least one consecutive resource unit in time domain, as shown in FIG. 8b. In addition, the resource unit bundling size provided in this application may be further applied to a combination of the foregoing two scenarios. A specific implementation of a combined scenario is not limited in this specification.

An example in which a resource unit is one RB is described in FIG. 8a and FIG. 8b. Specific implementation is not limited thereto. In FIG. 8a and FIG. 8b, each small shadow box represents a resource unit used when a base station schedules a terminal, and each small blank box represents a resource unit other than the resource unit used when the base station invokes the terminal. In FIG. 8a and FIG. 8b, an RB 1 and an RB 2 may be used as one time-frequency resource, and the time-frequency resource includes two resource units, and an RB 6 to an RB 10 may be used as another time-frequency resource, and the time-frequency resource includes five resource units.

Figure 9:
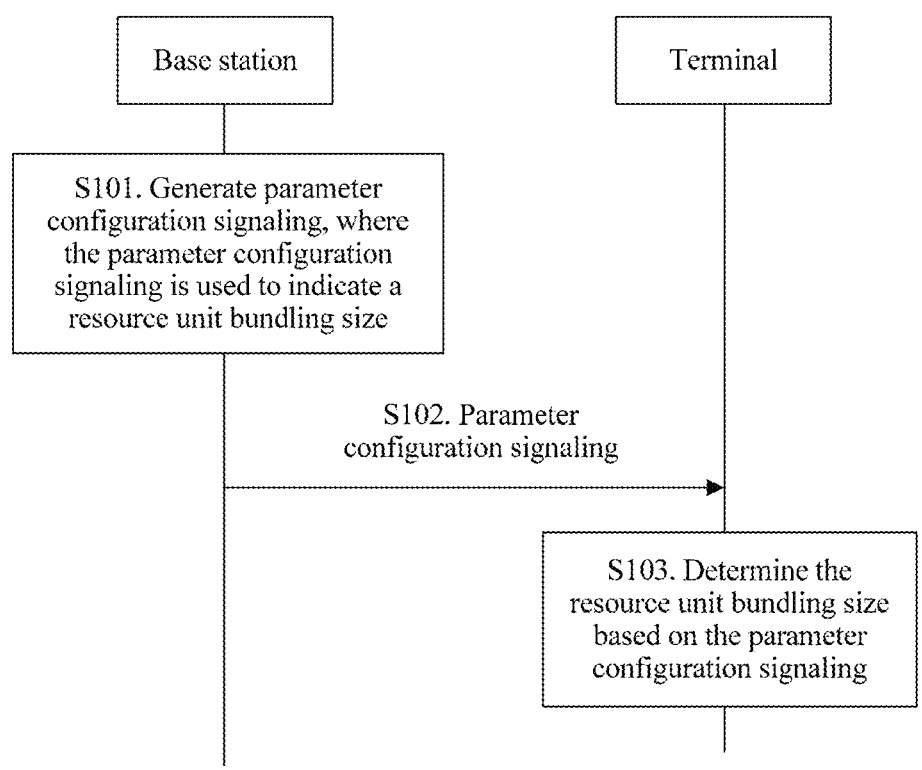
FIG. 9 is a schematic interaction diagram of a parameter configuration method according to this application.

FIG. 9 is a schematic interaction diagram of a parameter configuration method according to this application. The method may include the following steps S101 to S103.

S101. A base station generates parameter configuration signaling, where the parameter configuration signaling is used to indicate a resource unit bundling size.

S102. The base station sends the parameter configuration signaling.

S103. The terminal receives the parameter configuration signaling, and determines the resource unit bundling size based on the parameter configuration signaling.

In an optional embodiment, the parameter configuration signaling may be radio resource control (radio resource control, RRC). This embodiment is applicable to a scenario in which a resource unit bundling size for the terminal changes infrequently. Dynamic signaling overheads may be reduced in this embodiment.

In another optional embodiment, the parameter configuration signaling may be media access control (media access control, MAC) signaling. This embodiment is applicable to a scenario in which a resource unit bundling size for the terminal changes infrequently. Dynamic signaling overheads may be reduced in this embodiment.

In still another optional embodiment, the parameter configuration signaling may be downlink control information (downlink control information, DCI). This embodiment is applicable to a scenario in which a resource unit bundling size for the terminal changes frequently. In this embodiment, the DCI is used to set the resource unit bundling size, so that a channel change can be tracked in real time, thereby improving accuracy of a channel estimation result.

In this application, a condition for determining whether a resource unit bundling size changes frequently is not limited. The parameter configuration signaling in any one of the foregoing embodiments may be a piece of signaling in the prior art, so that signaling overheads are reduced, or may be a new piece of signaling provided in this application. Any one of the foregoing embodiments may be considered as a technical solution for directly setting a resource unit bundling size. In any one of the foregoing embodiments, the parameter configuration signaling may include a resource unit bundling size, an index of a resource unit bundling size, or other information that may be used to indicate a resource unit bundling size, and this is not limited in this application.

In an optional embodiment, the parameter configuration signaling may include a resource unit bundling size. It may be understood that if a correspondence between a resource unit bundling size and an index of the resource unit bundling size is agreed between the base station and the terminal by using a protocol, the parameter configuration signaling may include the index of the resource unit bundling size, so that the terminal may determine the resource unit bundling size based on the index of the resource unit bundling size. A specific implementation of the index of the resource unit bundling size is not limited in this application. For example, assuming that the resource unit bundling size is one resource unit, two resource units, four resource units, and five resource units, a 2-bit binary number ("00", "01", "10", and "11") may be used as indexes of the four resource unit bundling sizes. Certainly, specific implementation is not limited thereto.

According to the parameter configuration method provided in this embodiment, the base station may indicate a resource unit bundling size to the terminal by using the signaling, so that the resource unit bundling size can be flexibly set. In this way, in a scenario in which the base station schedules the terminal on an inconsecutive time-frequency resource in frequency domain or time domain, the accuracy of the channel estimation result is improved.

Figure 10:
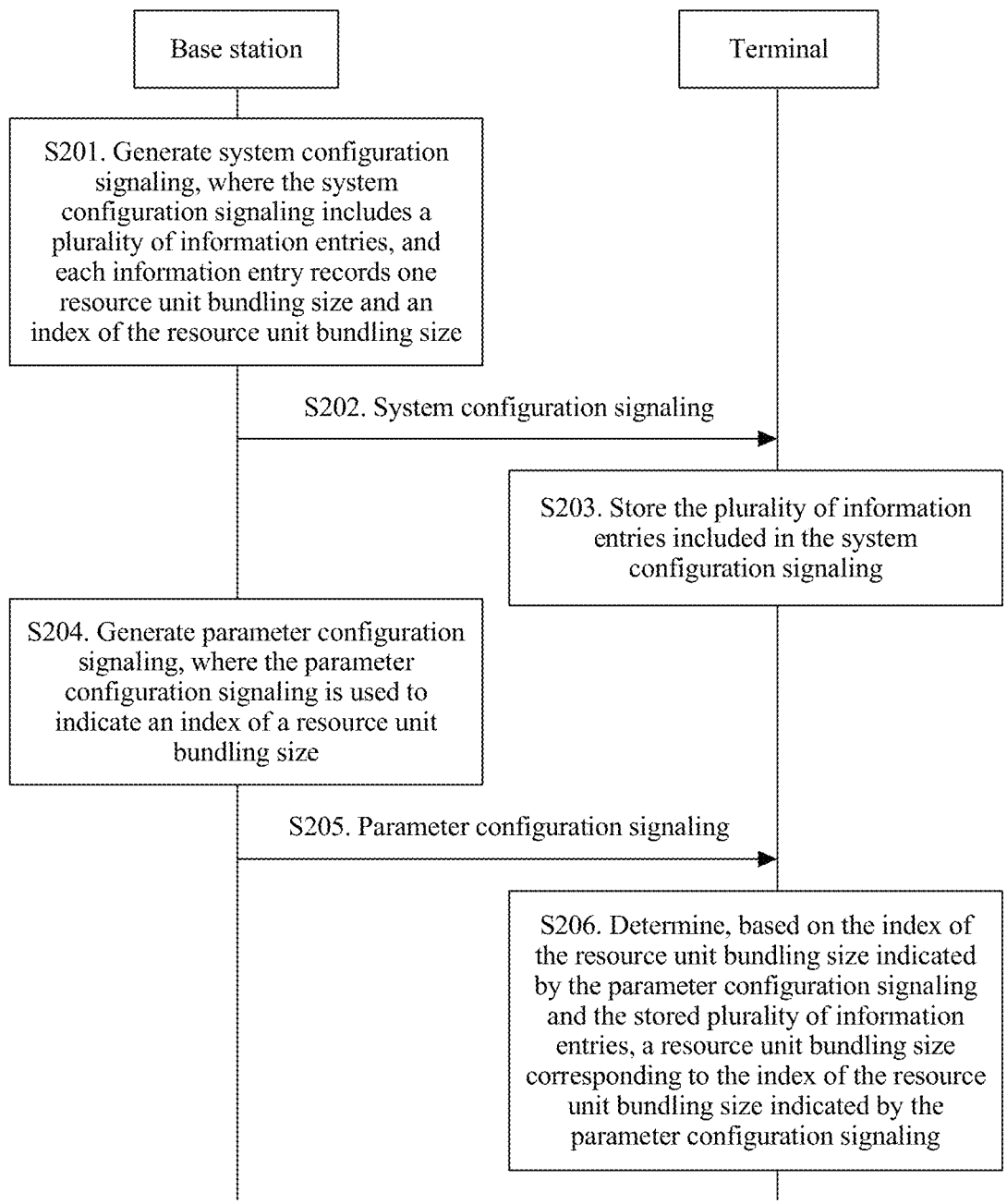
FIG. 10 is another schematic interaction diagram of a parameter configuration method according to this application.

FIG. 10 is a schematic interaction diagram of a parameter configuration method according to this application. The method may include the following steps S201 to S206.

S201. A base station generates system configuration signaling, where the system configuration signaling includes a plurality of information entries, and each information entry records one resource unit bundling size and an index of the resource unit bundling size.

The system configuration signaling may include RRC signaling and the like. The system configuration signaling may be a piece of signaling in the prior art, so that signaling overheads are reduced, or may be a new piece of signaling provided in this application. A quantity of pieces of RRC signaling is not limited in this application. For example, the plurality of information entries may be included in one piece of RRC signaling, or the plurality of information entries may be included in a plurality of pieces of RRC signaling.

Optionally, the resource unit bundling sizes included in the system configuration signaling may be some or all of resource unit bundling sizes supported by a system. For example, it is assumed that the system configuration signaling can support four resource unit bundling sizes in total: one resource unit, two resource units, four resource units, and five resource units. There are two possible resource unit bundling sizes in total whose system bandwidth is less than a threshold (for example, 20 megabytes): one resource unit and two resource units. In this case, a 1-bit binary number ("0" and "1") may be used as indexes of the two resource unit bundling sizes. For example, "0" is used as an index of the resource unit bundling size of one resource unit, and "1" is used as an index of the resource unit bundling size of two resource units. In other words, in this application, the base station may select, based on a criterion, for example, but not limited to the system bandwidth, one or more resource unit bundling sizes from the resource unit bundling sizes that can be supported by the system, and then indicate, to the terminal by using the RRC signaling, a correspondence between each resource unit bundling size in the one or more resource unit bundling sizes and an index of the resource unit bundling size. In this way, signaling overheads may be reduced.

S202. The base station sends the system configuration signaling.

S203. A terminal receives the system configuration signaling, and stores the plurality of information entries included in the system configuration signaling.

It may be understood that S201 to S203 are processes in which the base station indicates, to the terminal, a correspondence between each resource unit bundling size and an index of the resource unit bundling size.

S204. The base station generates parameter configuration signaling, where the parameter configuration signaling is used to indicate an index of a resource unit bundling size.

The parameter configuration signaling may be DCI, MAC signaling, or the like, and is used to indicate the index of the resource unit bundling size. The index may be an index of a resource unit bundling size included in one of the plurality of information entries in S101.

S205. The base station sends the parameter configuration signaling.

The base station may generate and send parameter configuration signaling to the terminal when a resource unit bundling size for the terminal changes. For example, the base station may generate and send parameter configuration signaling to the terminal when a scheduling resource of the terminal changes.

S206. The terminal receives the parameter configuration signaling, and determines, based on the index of the resource unit bundling size indicated by the parameter configuration signaling and the stored plurality of information entries, a resource unit bundling size corresponding to the index of the resource unit bundling size indicated by the parameter configuration signaling.

The terminal may query, from the stored plurality of information entries, the index of the resource unit bundling size indicated by the parameter configuration signaling, and then determine, a resource unit bundling size included in an information entry including the index of the resource unit bundling size, as a resource unit bundling size corresponding to the index of the resource unit bundling size indicated by the parameter configuration signaling. Based on the foregoing example in S101, it is assumed that when the index of the resource unit bundling size included in the parameter configuration signaling is "0", the resource unit bundling size determined by the terminal is one resource unit.

In this embodiment, the base station may indicate the correspondence between the resource unit bundling size and the index of the resource unit bundling size to the terminal by using the RRC signaling, and then indicate an index of a target resource unit bundling size by using the DCI or the MAC signaling, so that the terminal determines the target resource unit bundling size. In this way, accuracy of calculation results in different operation processes can be improved while dynamic signaling overheads are reduced.

According to the parameter configuration method provided in any one of the foregoing embodiments, the resource unit bundling size is set in a signaling indication manner. In this way, resource unit bundling sizes can be flexibly set in different scenarios. In particular, the method is applicable to a scenario in which a scheduling resource is inconsecutive.

The technical solution provided in this application may be understood as follows: When determining, based on a resource allocation status, that a resource allocated to the terminal is consecutive, the base station may set the resource unit bundling size by using the technical solution provided in the prior art. When determining, based on a resource allocation status, that a resource allocated to the terminal is inconsecutive (including inconsecutive in frequency domain and/or inconsecutive in time domain), the base station sets a backoff value of the resource unit bundling size in a signaling indication manner. The backoff value may be any one of resource unit bundling sizes provided in the following.

In the foregoing description, the base station notifies the terminal of the resource unit bundling size by using the signaling. In actual implementation, optionally, the base station may notify the terminal of the resource unit bundling size in the following manner. The resource unit bundling size provided in this application is set to a default value, and when determining, based on the resource allocation status, that the resource is inconsecutive (including inconsecutive in frequency domain and/or inconsecutive in time domain), the terminal determines the default value as valid, or when determining, based on the resource allocation status, that the resource is consecutive, the terminal ignores the default value.

According to any parameter configuration method provided above, the resource unit bundling size may include at least one of the following.

(1) One resource unit. In this implementation, complexity of an operation on a terminal side may be reduced.

(2) N resource units. N may be determined in any one of the following manners:

Manner 1: N may be a common divisor of total quantities of resource units included in all of at least two time-frequency resources. Optionally, N may be a greatest common divisor of total quantities of resource units included in all of at least two time-frequency resources. A larger resource unit bundling size can improve accuracy of a channel estimation result.

For example, as shown in FIG. 8a, RBs used by the base station to schedule the terminal are distributed in frequency domain. In this case, because a greatest common divisor of the total quantities (that is, 2 and 5) of the resource units included in the two time-frequency resources is 1, N=1. In other words, the terminal may independently perform channel estimation by using a DMRS carried on each RB. In this example, the terminal independently performs the channel estimation by using a DMRS carried on one time-frequency resource.

For another example, as shown in FIG. 8b, RBs used by the base station to schedule the terminal are distributed in time domain. In this case, because a greatest common divisor of the total quantities (2 and 5) of the resource units included in the two time-frequency resources is 1, N=1. In other words, the terminal may independently perform channel estimation by using a DMRS carried on each RB. In this example, the terminal independently performs the channel estimation by using a DMRS carried on one time-frequency resource.

Manner 2: N may be a total quantity of resource units included in a precoding granularity (precoding granularity, PRG).

For example, that the resource unit is an RB is used as an example. If the total quantity of resource units included in the PRG is 4 (that is, a PRG size is 4 RBs), N may be 4. To be specific, the resource unit bundling size (namely, an RB bundling size) may be four resource units (namely, 4 RBs).

Manner 3: N may be a divisor of a total quantity of resource units included in a precoding granularity.

For example, that the resource unit is an RB is used as an example. If a PRG size is 4 RBs, N may be 1, 2, or 4. To be specific, the resource unit bundling size (namely, an RB bundling size) may be one resource unit, two resource units, or four resource units.

Manner 4: N may be a smaller one of a greatest common divisor of total quantities of resource units included in all of the at least two time-frequency resources and a total quantity of resource units included in a precoding granularity.

For example, FIG. 8a is used as an example, and the greatest common divisor of the total quantities of the resource units included in all time-frequency resources is 1. If the total quantity of resource units included in the precoding granularity is 4, N may be 1.

(3) A divisor of a total quantity of RBs included in an RBG. A resource unit is an RBG.

For example, if a total quantity of RBs included in one RBG is 4, that is, an RBG size is 4 RBs, N may be 1, 2, or 4. It may be understood that, if the resource unit is a TIG, N may be a divisor of a total quantity of TIs included in the TIG.

The foregoing describes a technical solution for determining the resource unit bundling size when the resource is inconsecutive. In this case, the base station may further set the precoding granularity size in the following manner: (1) The precoding granularity size is one resource unit. (2) The precoding granularity size is N resource units. N may be a common divisor of total quantities of resource units included in all of at least two time-frequency resources. Optionally, N may be a greatest common divisor of total quantities of resource units included in all of at least two time-frequency resources. (3) The precoding granularity size is a divisor of a total quantity of RBs included in an RBG. A resource unit is an RBG. For specific examples of these manners, refer to the foregoing description. Details are not described herein again.

The foregoing mainly describes the solutions provided in the embodiments of this application from a perspective of interaction between network elements. It may be understood that to implement the foregoing functions, the network elements, for example, the base station and the terminal, include a corresponding hardware structure and/or a corresponding software module for performing the functions. A person of ordinary skill in the art should easily be aware that, in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the base station or the terminal may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used. That each functional module is obtained through division based on each corresponding function is used as an example for description below.

Figure 11:
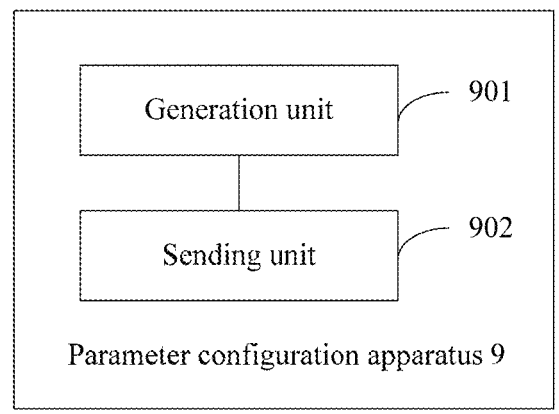
FIG. 11 is a schematic structural diagram of a parameter configuration apparatus according to this application.

FIG. 11 shows a schematic structural diagram of a parameter configuration apparatus 9. The apparatus 9 may be the foregoing base station 100. The apparatus 9 may include a generation unit 901 and a sending unit 902.

In a possible example, the generation unit 901 may be configured to perform S101 in FIG. 9, and/or be configured to support another process of the technology described in this specification. The sending unit 902 may be configured to perform an action performed by the base station in S102 in FIG. 9, and/or may be configured to support another process of the technology described in this specification. All related content of the steps in the foregoing method embodiments can be cited in function descriptions of corresponding functional modules, and details are not described herein again.

In a possible example, the generation unit 901 may be configured to perform actions performed by the base station in S201 and S204 in FIG. 10, and/or be configured to support another process of the technology described in this specification. The sending unit 902 may be configured to perform S202 and S205 in FIG. 10, and/or be configured to support another process of the technology described in this specification. All related content of the steps in the foregoing method embodiments can be cited in function descriptions of corresponding functional modules, and details are not described herein again.

Figure 12:
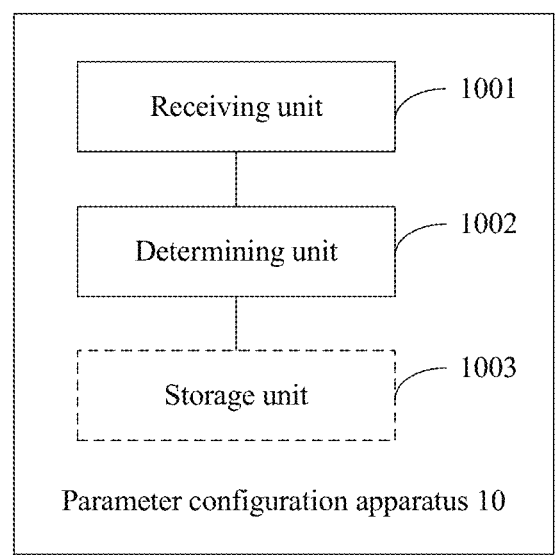
FIG. 12 is another schematic structural diagram of a parameter configuration apparatus according to this application.

FIG. 12 shows a schematic structural diagram of a parameter configuration apparatus 10. The apparatus 10 may be the foregoing terminal 200. The apparatus 10 may include a receiving unit 1001 and a determining unit 1002.

In a possible example, the receiving unit 1001 may be configured to perform an action performed by the terminal in S102 in FIG. 9, and/or be configured to support another process of the technology described in this specification. The determining unit 1002 may be configured to perform S103 in FIG. 9, and/or be configured to support another process of the technology described in this specification. All related content of the steps in the foregoing method embodiments can be cited in function descriptions of corresponding functional modules, and details are not described herein again.

In another possible example, the receiving unit 1001 may be configured to perform an action performed by the terminal in S202 in FIG. 10, and/or be configured to support another process of the technology described in this specification. The determining unit 1002 may be configured to perform S206 in FIG. 10, and/or be configured to support another process of the technology described in this specification. In addition, the apparatus may further include a storage unit 1003, configured to perform S203, and/or configured to support another process of the technology described in this specification. All related content of the steps in the foregoing method embodiments can be cited in function descriptions of corresponding functional modules, and details are not described herein again.

In this embodiment of this application, the parameter configuration apparatus 9 and the parameter configuration apparatus 10 are presented in a form of dividing each functional module according to a corresponding function, or the parameter configuration apparatus 9 and the parameter configuration apparatus 10 are presented in a form of dividing each functional module (or unit) in an integrated manner. The "module" herein may be an application-specific integrated circuit (application-specific integrated circuit, ASIC), a processor that executes one or more software or firmware programs and a memory, an integrated logic circuit, and/or another component that can provide the foregoing functions. The processor and the memory may be integrated together, or may be independent of each other.

Figure 13:
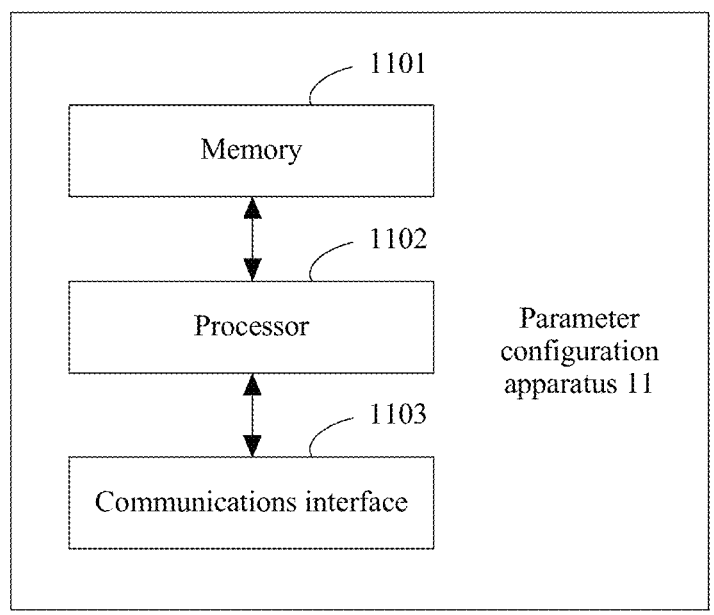
FIG. 13 is another schematic structural diagram of a parameter configuration apparatus according to this application.

In a simple embodiment, a person skilled in the art may figure out that either of the parameter configuration apparatus 9 and the parameter configuration apparatus 10 is implemented by using a structure shown in FIG. 13.

As shown in FIG. 13, a parameter configuration apparatus 11 may include a memory 1101, a processor 1102, and a communications interface 1103. The memory 1101 is configured to store a computer executable instruction. When the parameter configuration apparatus 11 runs, the processor 1102 executes the computer executable instruction stored in the memory 1101, so that the parameter configuration apparatus 11 performs the parameter configuration method provided in the embodiments of this application. For a specific parameter configuration method, refer to the foregoing descriptions and related descriptions in the accompanying drawings. Details are not described herein again. The communications interface 1103 may be a transceiver.

In an example, the sending unit 902 may correspond to the communications interface 1103. The generation unit 901 may be built in or independent of the memory 1101 of the parameter configuration apparatus 11 in a hardware form.

In another example, the receiving unit 1001 may correspond to the communications interface 1103. The determining unit 1002 may be built in or independent of the memory 1101 of the parameter configuration apparatus 11 in a hardware form.

Optionally, the parameter configuration apparatus 11 may be a field-programmable gate array (field-programmable gate array, FPGA), an application-specific integrated circuit (application-specific integrated circuit, ASIC), a system on chip (system on chip, SoC), or a central processing unit (central processing unit, CPU), a network processor (network processor, NP), a digital signal processor (digital signal processor, DSP), a micro control unit (micro control unit, MCU), or a programmable logic device (programmable logic device, PLD) or another integrated chip may be used.

An embodiment of this application further provides a storage medium, and the storage medium may include the memory 1101.

Because a parameter configuration apparatus provided in this embodiment of this application may be configured to perform the foregoing parameter configuration method, for a technical effect that can be achieved by the parameter configuration apparatus, refer to the foregoing method embodiments. Details are not described again in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are all or partially generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the appended claims, and are considered as any of or all modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A parameter configuration method, comprising:
   receiving, by a terminal, system configuration signaling, wherein the system configuration signaling is radio resource control (RRC) signaling, the system configuration signaling comprises a plurality of information entries, and each information entry in the plurality of information entries records one resource unit bundling size and a corresponding index of the resource unit bundling size;
   receiving, by the terminal, parameter configuration signaling, wherein the parameter configuration signaling is media access control (MAC) signaling or downlink control information (DCI) signaling, and the parameter configuration signaling comprises information indicating an index of a resource unit bundling size, the index of the resource unit bundling size is used to determine the resource unit bundling size, and the resource unit bundling size is:
   applied to at least two inconsecutive time-frequency resources in frequency domain, and each of the at least two inconsecutive time-frequency resources in frequency domain comprises at least one consecutive resource unit in frequency domain; or
   applied to at least two inconsecutive time-frequency resources in time domain, and each of the at least two inconsecutive time-frequency resources in time domain comprises at least one consecutive resource unit in time domain; and
   determining, by the terminal, the resource unit bundling size based on the parameter configuration signaling.

2. The method according to claim 1, wherein the resource unit bundling size is one of the following:
   one resource unit;
   N resource units, wherein N is a common divisor of total quantities of resource units comprised in all of the at least two time-frequency resources, or a total quantity of resource units comprised in a precoding granularity, or a divisor of a total quantity of resource units comprised in a precoding granularity, or a smaller one of a greatest common divisor of total quantities of resource units comprised in all of the at least two time-frequency resources and a total quantity of resource units comprised in a precoding granularity; or
   a divisor of a total quantity of resource blocks (RBs) comprised in a resource block group (RBG), wherein a resource unit is an RBG.

3. A parameter configuration apparatus, comprising:
   a transceiver;
   at least one processor; and
   one or more memories coupled to the at least one processor and storing programming instructions for execution by the at least one processor to cause the apparatus to:
   generate system configuration signaling, wherein the system configuration signaling is radio resource control (RRC) signaling, the system configuration signaling comprises a plurality of information entries, and each information entry in the plurality of information entries records one resource unit bundling size and a corresponding index of the resource unit bundling size;
   send, by using the transceiver, the system configuration signaling,
   generate parameter configuration signaling, wherein the parameter configuration signaling is media access control (MAC) signaling or downlink control information (DCI) signaling, and the parameter configuration signaling comprises information indicating an index of a resource unit bundling size, the index of the resource unit bundling size is used to determine the resource unit bundling size, and the resource unit bundling size is:
   applied to at least two inconsecutive time-frequency resources in frequency domain, and each of the at least two inconsecutive time-frequency resources in frequency domain comprises at least one consecutive resource unit in frequency domain; or
   applied to at least two inconsecutive time-frequency resources in time domain, and each of the at least two inconsecutive time-frequency resources in time domain comprises at least one consecutive resource unit in time domain; and
   send, by using the transceiver, the parameter configuration signaling.

4. The apparatus according to claim 3, wherein the resource unit bundling size is one of the following:
   one resource unit;
   N resource units, wherein N is a common divisor of total quantities of resource units comprised in all of the at least two time-frequency resources, or a total quantity of resource units comprised in a precoding granularity, or a divisor of a total quantity of resource units comprised in a precoding granularity, or a smaller one of a greatest common divisor of total quantities of resource units comprised in all of the at least two time-frequency resources and a total quantity of resource units comprised in a precoding granularity; or
   a divisor of a total quantity of resource blocks (RBs) comprised in a resource block group (RBG), wherein a resource unit is an RBG.

5. A parameter configuration apparatus, comprising:
   a transceiver;
   at least one processor; and
   one or more memories coupled to the at least one processor and storing programming instructions for execution by the at least one processor to cause the apparatus to:

receive, by using the transceiver, system configuration signaling, wherein the system configuration signaling is radio resource control (RRC) signaling, the system configuration signaling comprises a plurality of information entries, and each information entry in the plurality of information entries records one resource unit bundling size and a corresponding index of the resource unit bundling size;

receive, by using the transceiver, parameter configuration signaling, wherein the parameter configuration signaling is media access control (MAC) signaling or downlink control information (DCI) signaling, and the parameter configuration signaling comprises information indicating an index of a resource unit bundling size, the index of the resource unit bundling size is used to determine the resource unit bundling size, and the resource unit bundling size is:

applied to at least two inconsecutive time-frequency resources in frequency domain, and each of the at least two inconsecutive time-frequency resources in frequency domain comprises at least one consecutive resource unit in frequency domain; or applied to at least two inconsecutive time-frequency resources in time domain, and each of the at least two inconsecutive time-frequency resources in time domain comprises at least one consecutive resource unit in time domain; and determine the resource unit bundling size based on the parameter configuration signaling.

6. The apparatus according to claim 5, wherein the resource unit bundling size is one of the following:

one resource unit;

N resource units, wherein N is a common divisor of total quantities of resource units comprised in all of the at least two time-frequency resources, or a total quantity of resource units comprised in a precoding granularity, or a divisor of a total quantity of resource units comprised in a precoding granularity, or a smaller one of a greatest common divisor of total quantities of resource units comprised in all of the at least two time-frequency resources and a total quantity of resource units comprised in a precoding granularity; or a divisor of a total quantity of resource blocks (RBs) comprised in a resource block group (RBG), wherein a resource unit is an RBG.

7. A non-transitory computer-readable storage medium, storing a computer program, wherein when executing the program, a computer implements:

receiving system configuration signaling, wherein the system configuration signaling is radio resource control (RRC) signaling, the system configuration signaling comprises a plurality of information entries, and each information entry in the plurality of information entries records one resource unit bundling size and a corresponding index of the resource unit bundling size;

receiving parameter configuration signaling, wherein the parameter configuration signaling is media access control (MAC) signaling or downlink control information (DCI) signaling, and the parameter configuration signaling comprises information indicating an index of a resource unit bundling size, the index of the resource unit bundling size is used to determine the resource unit bundling size, and the resource unit bundling size is:

applied to at least two inconsecutive time-frequency resources in frequency domain, and each of the at least two inconsecutive time-frequency resources in frequency domain comprises at least one consecutive resource unit in frequency domain; or applied to at least two inconsecutive time-frequency resources in time domain, and each of the at least two inconsecutive time-frequency resources in time domain comprises at least one consecutive resource unit in time domain; and determining the resource unit bundling size based on the parameter configuration signaling.

8. The non-transitory computer-readable storage medium according to claim 7, wherein the resource unit bundling size is one of the following:

one resource unit;

N resource units, wherein N is a common divisor of total quantities of resource units comprised in all of the at least two time-frequency resources, or a total quantity of resource units comprised in a precoding granularity, or a divisor of a total quantity of resource units comprised in a precoding granularity, or a smaller one of a greatest common divisor of total quantities of resource units comprised in all of the at least two time-frequency resources and a total quantity of resource units comprised in a precoding granularity; or a divisor of a total quantity of resource blocks (RBs) comprised in a resource block group (RBG), wherein a resource unit is an RBG.

* * * * *